US010999540B1

(12) United States Patent
Li et al.

(10) Patent No.: US 10,999,540 B1
(45) Date of Patent: May 4, 2021

(54) CAMERA WITH ASYMMETRIC FIELD OF VIEW

(71) Applicant: Apple Inc., Cupertino, CA (US)

(72) Inventors: Sijie Li, San Jose, CA (US); Rui L. Peterson, San Jose, CA (US); Matthew C Waldon, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/792,323

(22) Filed: Feb. 17, 2020

Related U.S. Application Data

(60) Provisional application No. 62/828,500, filed on Apr. 3, 2019.

(51) Int. Cl.
*H04N 5/351* (2011.01)
*H04N 5/345* (2011.01)
*H04N 5/225* (2006.01)

(52) U.S. Cl.
CPC .......... *H04N 5/351* (2013.01); *H04N 5/2253* (2013.01); *H04N 5/2254* (2013.01); *H04N 5/3454* (2013.01)

(58) Field of Classification Search
CPC .... H04N 5/351; H04N 5/2254; H04N 5/3454; H04N 5/2253
See application file for complete search history.

(56) References Cited

U.S. PATENT DOCUMENTS

| | | | | |
|---|---|---|---|---|
| 8,531,580 | B2 * | 9/2013 | Choi | H04N 5/23238 348/340 |
| 2010/0194673 | A1 * | 8/2010 | Perrett | H01L 27/14627 345/90 |
| 2010/0277935 | A1 * | 11/2010 | Endo | G08G 1/04 362/466 |
| 2016/0044284 | A1 * | 2/2016 | Goseberg | G06F 3/012 348/148 |
| 2016/0137126 | A1 * | 5/2016 | Fursich | H04N 5/23238 348/38 |
| 2016/0218127 | A1 * | 7/2016 | Kato | H01L 27/14643 |
| 2017/0077164 | A1 * | 3/2017 | Kawabata | H01L 27/14627 |
| 2017/0171470 | A1 * | 6/2017 | Sakioka | H04N 5/3696 |
| 2019/0326341 | A1 * | 10/2019 | Gravelle, Jr. | G02B 3/0037 |
| 2020/0021767 | A1 * | 1/2020 | Ikedo | H01L 31/107 |
| 2020/0064522 | A1 * | 2/2020 | Blasco Claret | G02B 3/0056 |
| 2020/0219916 | A1 * | 7/2020 | Igarashi | G05D 1/0246 |
| 2020/0341558 | A1 * | 10/2020 | Fukushima | G02B 27/02 |

\* cited by examiner

*Primary Examiner* — Shahbaz Nazrul

(74) *Attorney, Agent, or Firm* — Kliger & Associates Patent Attorneys Ltd

(57) ABSTRACT

An imaging device includes objective optics configured to form an image at a focal plane and having an optical axis that intersects the focal plane at an optical center. An image sensor, which includes an array of sensor elements arranged in a matrix of rows and columns, is positioned in the focal plane with a center point of the matrix displaced transversely by at least ten rows relative to the optical center.

11 Claims, 5 Drawing Sheets

CAMERA WITH ASYMMETRIC FIELD OF VIEW

CROSS-REFERENCE TO RELATED APPLICATION

This application claims the benefit of U.S. Provisional Patent Application 62/828,500, filed Apr. 3, 2019, which is incorporated herein by reference.

FIELD OF THE INVENTION

The present invention relates generally to electronic imaging, and particularly to image sensors and cameras, as well as methods for production of such cameras.

BACKGROUND

Most mobile communication and computing devices that are currently on the market include at least one built-in camera. These cameras are used extensively in capturing images of the user of the device. In addition to the documentary use of such images as "selfies," they are also used in some devices, such as the iPhone® X, for authentication of the user by automatic face recognition.

SUMMARY

Embodiments of the present invention that are described hereinbelow provide improved electronic cameras and methods for their production.

There is therefore provided, in accordance with an embodiment of the invention, an imaging device, including objective optics configured to form an image at a focal plane and having an optical axis that intersects the focal plane at an optical center. An image sensor, which includes an array of sensor elements arranged in a matrix of rows and columns, is positioned in the focal plane with a center point of the matrix displaced transversely by at least ten rows relative to the optical center, or possibly by at least fifty rows relative to the optical center.

In some embodiments, the sensor elements include respective pixel electrodes and microlenses, and in at least some of the sensor elements, the microlenses are shifted transversely relative to the pixel electrodes in a direction toward the optical center by respective shifts that increase responsively to a distance between the sensor elements and the optical center. In a disclosed embodiment, due to displacement of the center point of the matrix relative to the optical sensor, a first row at a first edge of the matrix is nearer to the optical center than a last row at a second edge of the matrix, opposite the first edge, and the respective shifts of the microlenses of the sensor elements in the last row are greater than the respective shifts of the microlenses of the sensor elements in the first row.

There is also provided, in accordance with an embodiment of the invention, imaging apparatus, including a handheld mobile computing device and an imaging device, which is installed in the mobile computing device in proximity to an upper end of the mobile computing device. The imaging device includes objective optics configured to form an image at a focal plane and having an optical axis that intersects the focal plane at an optical center, and an image sensor, which includes an array of sensor elements arranged in a matrix of rows and columns and is positioned in the focal plane with a center point of the matrix displaced transversely by at least ten rows relative to the optical center in an upward direction with respect to the mobile computing device.

There is additionally provided, in accordance with an embodiment of the invention, a method for fabrication of an imaging device. The method includes providing an image sensor, which includes an array of sensor elements arranged in a matrix of rows and columns. Objective optics are positioned so as to form an image at a focal plane, the objective optics having an optical axis that intersects the focal plane at an optical center. The image sensor is aligned in the focal plane with a center point of the matrix displaced transversely by at least ten rows relative to the optical center.

In some embodiments, aligning the image sensor includes identifying the optical center of the objective optics, finding the center point of the matrix, and shifting the image sensor transversely in the focal plane relative to the objective optics to as to align the center point at a desired displacement from the identified optical center. In a disclosed embodiment, shifting the image sensor includes capturing an image of a test pattern using the image sensor, and processing signals output by the image sensor so as to align the center point with respect to the test pattern.

The present invention will be more fully understood from the following detailed description of the embodiments thereof, taken together with the drawings in which:

DETAILED DESCRIPTION OF EMBODIMENTS

Figure 1:
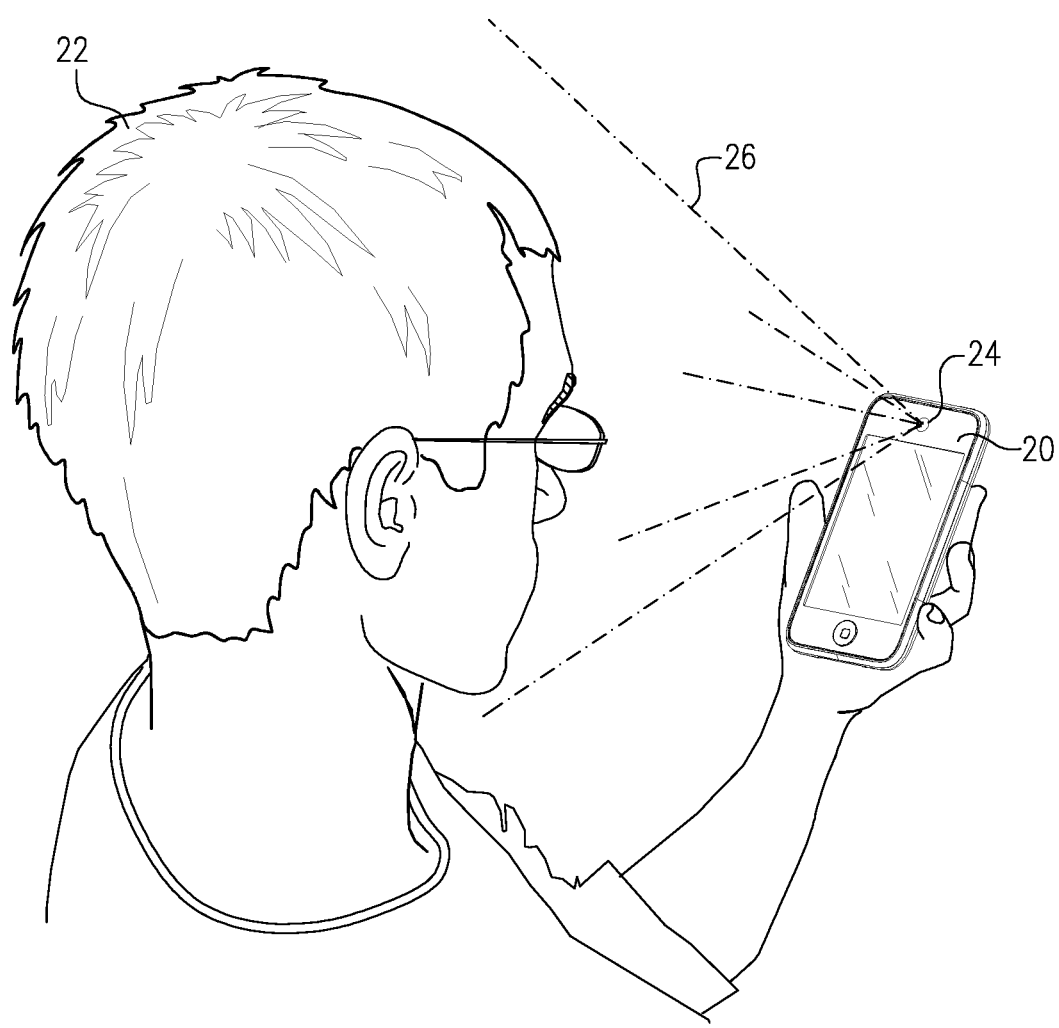
FIG. 1 is a schematic pictorial illustration of a mobile telephone showing a field of view of a camera built into the mobile telephone, in accordance with an embodiment of the invention.

FIG. 1 is a schematic pictorial illustration of a mobile telephone 20, showing a field of view 26 of a camera 24 built into the mobile telephone, in accordance with an embodiment of the invention. In the pictured scenario, camera 24 is in the process of capturing an image of user 22, for example for the purpose of automatic face recognition.

User 22 is not positioned directly in front of camera 24, however, but rather is looking at telephone 20 from a low angle—as users of smartphones commonly do. In this situation, if field of view 26 were symmetrical relative to the front face of telephone 20 (meaning that the field opens at equal angles above and below an axis perpendicular to the front face, as in telephones that are known in the art), the lower part of the user's face might be outside the lower edge of the image. As a result, the telephone might fail to recognize the user's face.

Therefore, in embodiments of the present invention, camera 24 is designed and installed in telephone 20 so that field of view 26 is asymmetrical. Specifically, in the pictured embodiment, the field of view opens further downward than upward, meaning that the central axis of the field of view is not perpendicular to the front face of telephone 20, but is rather inclined downward. Camera 24 thus captures the entire area of the user's face, albeit at the expense of a reduction of the field of view in the upward direction. Although it might alternatively be possible to ensure that the entire face of the user is captured by increasing the field angle of the camera, this approach either would require a larger image sensor and more complex and costly optics, or would result in degradation of the image quality (or both).

By contrast with such an approach, embodiments of the present invention make optimal use of a given image sensor and optical design in adjusting field of view 26 to meet the actual, asymmetrical imaging requirements, by aligning the image sensor asymmetrically relative to the objective optics in camera 24. Implementations of this principle are illustrated in the figures that follow.

Figure 2A:
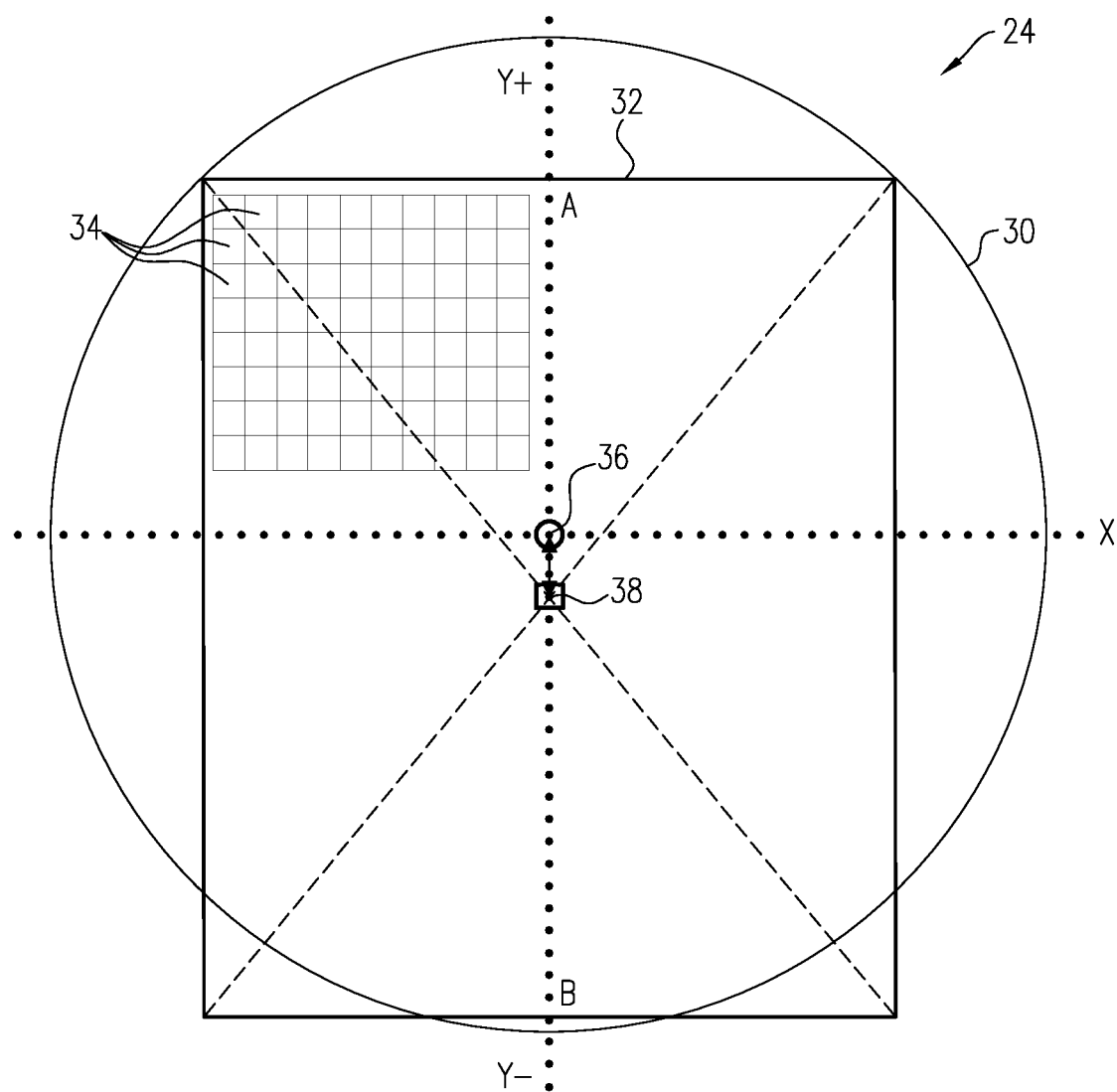
FIGS. 2A and 2B are schematic frontal and sectional views, respectively, of objective optics and an image sensor in a camera, in accordance with an embodiment of the invention.
Figure 2B:
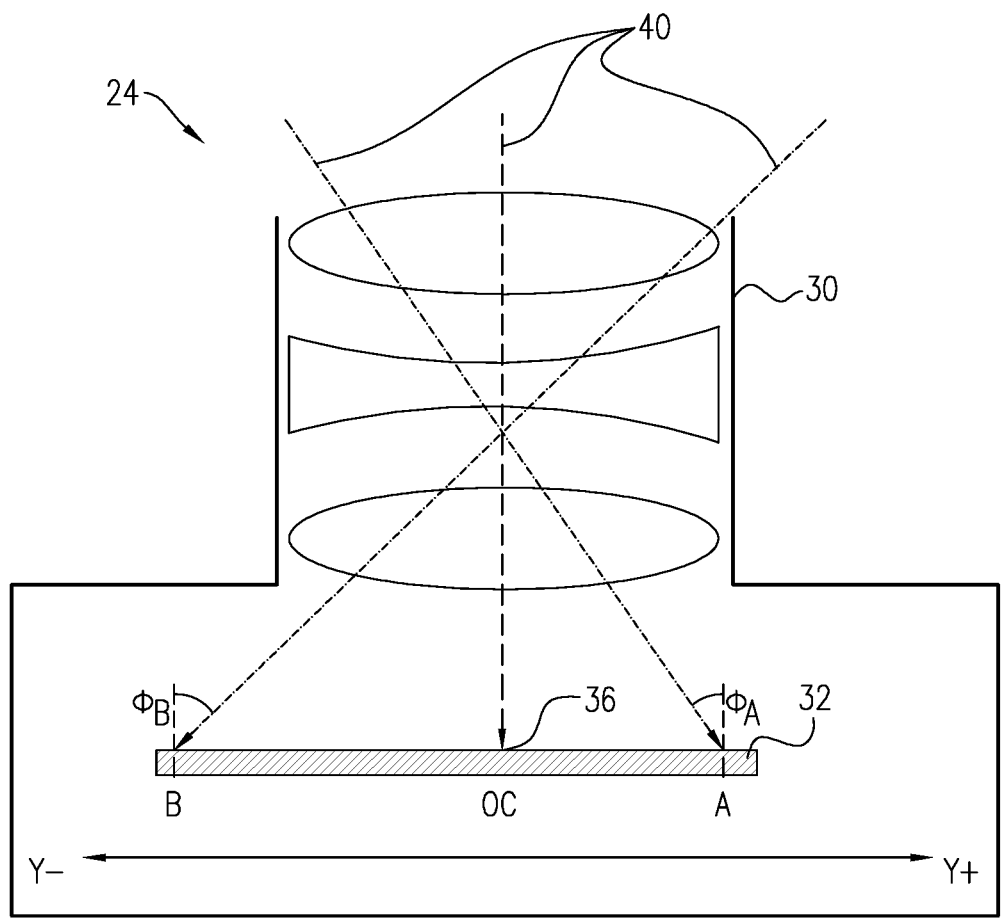

FIGS. 2A and 2B are schematic frontal and sectional views, respectively, of objective optics 30 and an image sensor 32 in camera 24, in accordance with an embodiment of the invention. Image sensor 32 comprises an array of sensor elements 34 arranged in a matrix of rows and columns (only partly shown in the figures, with the size of the sensor elements enlarged for clarity of illustration). The array has a geometrical center point 38, which can be defined, for example, as the point of intersection of the diagonals of the matrix of sensor elements, as shown in FIG. 2A. For the sake of convenience, the rows of the matrix are assumed to extend in the horizontal (X) direction, while the columns extend in the vertical (Y) direction. The terms "rows" and "columns" are used arbitrarily and interchangeably, however, without regard to the internal functioning and readout mechanisms of image sensor 32.

Objective optics 30 comprise one or more lenses, which form an image at a focal plane, where image sensor 32 is positioned. Objective optics 30 are typically rotationally symmetrical, and thus have an optical axis that runs along the center of rotation of the optics. This optical axis intersects the focal plane (and thus image sensor 32) at an optical center 36. Center point 38 of image sensor 32 does not coincide with optical center 36, but rather is displaced transversely by a substantial distance in the −Y direction in order to achieve the desired asymmetrical field of view 26 of camera 24.

The extent of displacement of center point 38 relative to optical center 36 depends on application requirements, such as the numbers of rows and columns in image sensor 32, as well as the overall field of view 26 and its degree of asymmetry. Typically, center point 38 is displaced by at least ten rows of sensor elements 34 relative to optical center 36. In modern image sensors, which typically comprise matrices of more than 1000×1000 sensor elements, center point 38 can be displaced transversely by at least 50 rows relative to optical center 36, and possibly even 100 rows. For example, assuming the image sensor to have a pitch of about 2 μm, the displacement of the center point relative to the optical sensor may be on the order of 100-200 μm.

Referring back to mobile telephone 20 (FIG. 1), in which camera 24 is installed in proximity to the upper end of the mobile computing device, center point 38 of image sensor 24 is displaced transversely relative to optical center 36 in an upward direction with respect to the telephone. (In other words, the +Y direction in FIG. 2A points downward in the frame of reference of telephone 20.) In consequence, the central axis of field of view 26 will be tilted downward by an angle proportional to the upward displacement of center point 38 relative to optical center 36. For example, given a total field of view of 80-90° in the vertical direction, the displacement of image sensor 24 may be sufficient to tilt the central axis of the field by about 5°.

FIG. 2B also shows chief rays 40 that are incident through optics 30 on different points on image sensor 32. These points include optical center 36, where the chief ray is normally incident, and peripheral locations A and B at the +Y and −Y edges of the array of sensor elements 34, where the chief rays are incident at angles $\phi_A$ and $\phi_B$, respectively. Because of the transverse displacement of image sensor 32, location A, in the first row at the +Y edge of image sensor 32, is nearer to optical center 36 than location B, in the last row at the opposite, −Y edge. (The terms "first" and "last" are used arbitrarily in this context.) Therefore, $\phi_A < \phi_B$.

Figure 3C:
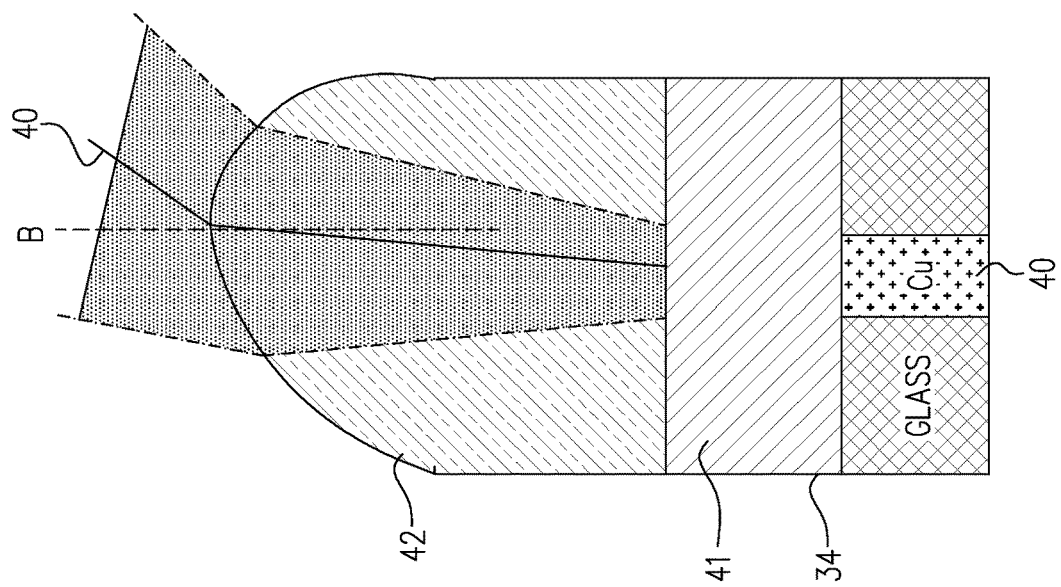
FIGS. 3A-3C are schematic sectional views of sensor elements at different locations in an image sensor in a camera, in accordance with an embodiment of the invention.
Figure 3B:
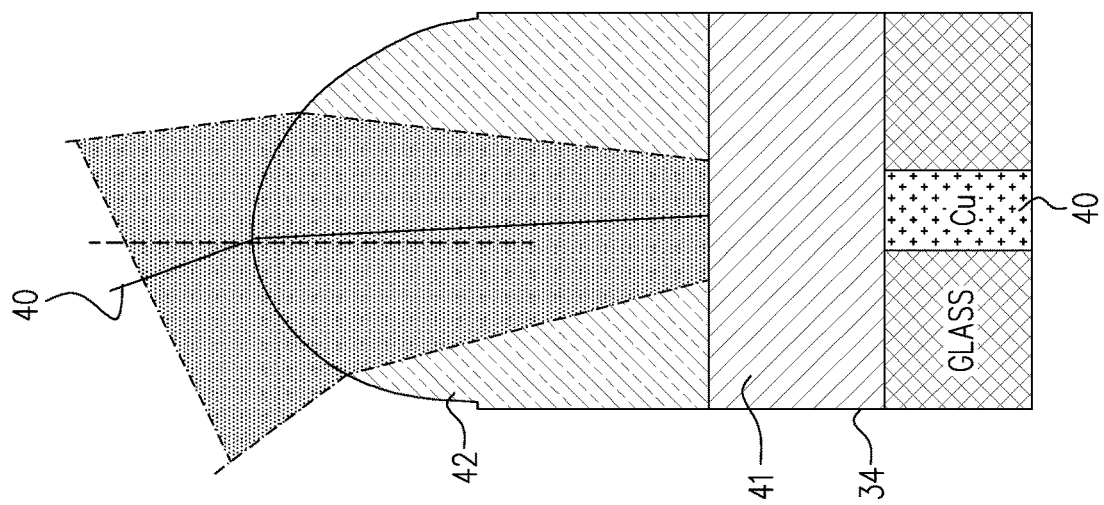
Figure 3A:
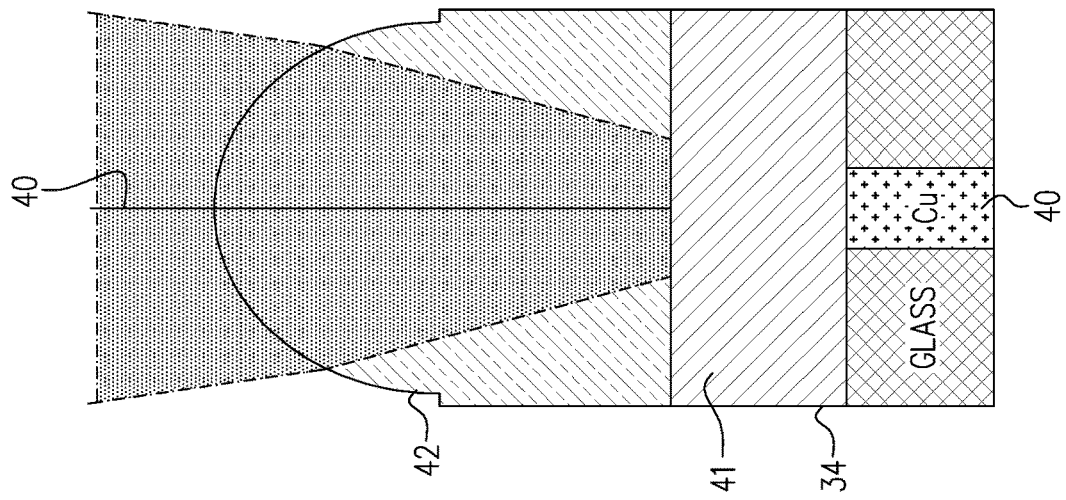

FIGS. 3A-3C are schematic sectional views of sensor elements 34 at optical center 36 and at locations A and B, respectively, in accordance with an embodiment of the invention. Each sensor element 34 comprises a respective pixel electrode 40, which collects photocharge from a corresponding photosensitive area 41. To enhance the optical collection efficiency, each sensor element 34 comprises a microlens 42, which concentrates incident radiation onto the central area of the sensor element.

For optimal radiation collection, it is desirable that microlenses 42 be aligned with the angles of chief rays 40 that are incident on the corresponding sensor elements 34. For this reason, in at least some of the sensor elements, microlenses 42 are shifted transversely relative to pixel electrodes 44 in a direction toward optical center 36, as illustrated in FIGS. 3B and 3C. The respective shifts increase in response to the increase in the chief ray angles as the distance increases between the sensor elements and the optical center. Specifically, in the example shown in FIGS. 3B and 3C, because $\phi_A < \phi_a$ (as explained above), the respective shift of microlens 42 at location B in the last row of image sensor 32 is greater than that of the microlens at location A in the first row.

Figure 4:
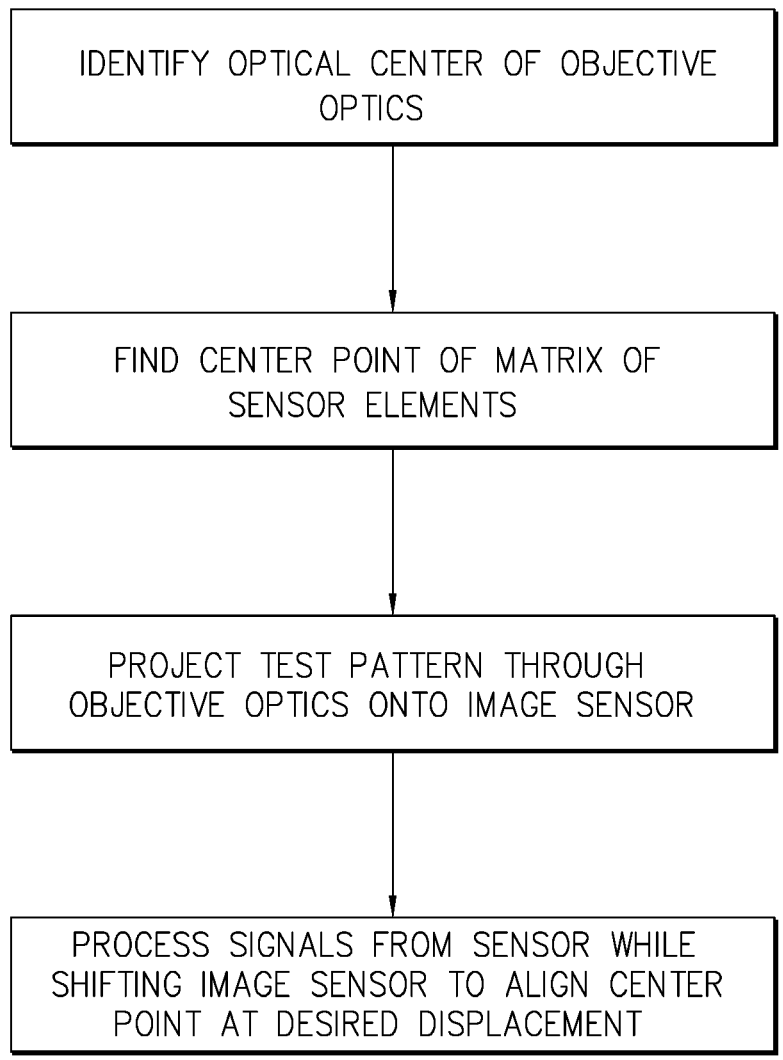
FIG. 4 is a flow chart that schematically illustrates a method for assembly of a camera, in accordance with an embodiment of the invention.

FIG. 4 is a flow chart that schematically illustrates a method for assembly of camera 24, in accordance with an embodiment of the invention. This method uses active alignment to position center point 38 of image sensor 32 at the desired displacement from optical center 36. It can advantageously be performed with the camera held in a test jig (not shown), which projects a test pattern through objective optics 30 onto image sensor 32, and permits signals from the image sensor to be read out and processed while the position of the image sensor is adjusted.

To begin the alignment process, optical center 36 of objective optics 30 is identified and aligned with the test jig, and thus with the projected test pattern. Center point 38 of image sensor 32 is likewise identified, for example on the basis of the pixel signal that is output from the corresponding sensor element 34. Image sensor 32 captures an image of the test pattern that is projected by the jig, and the signals output by the image sensor are processed to find the location of center point 38 relative to the test pattern. The image sensor is shifted transversely in the focal plane relative to objective optics 30 so as to align center point 38 with respect to the test pattern at the desired displacement from optical center 36. Image sensor 32 is then fixed permanently in place in camera 24.

In the embodiments above, camera 24 is designed to have an asymmetrical field of view in order to solve a particular problem that is encountered in the use of handheld mobile computing devices, exemplified by mobile telephone 20. Alternatively, the principles of the present invention may be applied to optimize the field of view of cameras in other applications. These alternative embodiments are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An imaging device, comprising:
objective optics configured to form an image at a focal plane and having an optical axis that intersects the focal plane at an optical center; and
an image sensor, which comprises an array of sensor elements arranged in a matrix of rows and columns and is positioned in the focal plane with a center point of the matrix displaced transversely by at least ten rows relative to the optical center,
wherein the sensor elements comprise respective pixel electrodes and microlenses, and wherein in at least some of the sensor elements, the microlenses are shifted transversely relative to the pixel electrodes in a direction toward the optical center by respective shifts that increase responsively to a distance between the sensor elements and the optical center,
wherein due to displacement of the center point of the matrix relative to the optical sensor, a first row at a first edge of the matrix is nearer to the optical center than a last row at a second edge of the matrix, opposite the first edge, and wherein the respective shifts of the microlenses of the sensor elements in the last row are greater than the respective shifts of the microlenses of the sensor elements in the first row.

2. The device according to claim 1, wherein the center point of the matrix is displaced transversely by at least fifty rows relative to the optical center.

3. Imaging apparatus, comprising:
a hand-held mobile computing device; and
an imaging device, which is installed in the mobile computing device in proximity to an upper end of the mobile computing device and comprises:
objective optics configured to form an image at a focal plane and having an optical axis that intersects the focal plane at an optical center; and
an image sensor, which comprises an array of sensor elements arranged in a matrix of rows and columns and is positioned in the focal plane with a center point of the matrix displaced transversely by at least ten rows relative to the optical center in an upward direction with respect to the mobile computing device.

4. The apparatus according to claim 3, wherein the center point of the matrix is displaced transversely by at least fifty rows relative to the optical center.

5. The apparatus according to claim 3, wherein the sensor elements comprise respective pixel electrodes and microlenses, and wherein in at least some of the sensor elements, the microlenses are shifted transversely relative to the pixel electrodes in a direction toward the optical center by respective shifts that increase responsively to a distance between the sensor elements and the optical center.

6. The apparatus according to claim 5, wherein due to displacement of the center point of the matrix relative to the optical sensor, a first row at a first edge of the matrix is nearer to the optical center than a last row at a second edge of the matrix, opposite the first edge, and wherein the respective shifts of the microlenses of the sensor elements in the last row are greater than the respective shifts of the microlenses of the sensor elements in the first row.

7. A method for fabrication of an imaging device, the method comprising:
providing an image sensor, which comprises an array of sensor elements arranged in a matrix of rows and columns; positioning objective optics so as to form an image at a focal plane, the objective optics having an optical axis that intersects the focal plane at an optical center; and
aligning the image sensor in the focal plane with a center point of the matrix displaced transversely by at least ten rows relative to the optical center,
wherein aligning the image sensor comprises:
identifying the optical center of the objective optics;
finding the center point of the matrix; and
shifting the image sensor transversely in the focal plane relative to the objective optics to as to align the center point at a desired displacement from the identified optical center,
wherein shifting the image sensor comprises capturing an image of a test pattern using the image sensor, and processing signals output by the image sensor so as to align the center point with respect to the test pattern.

8. The method according to claim 7, wherein the center point of the matrix is displaced transversely by at least fifty rows relative to the optical center.

9. The method according to claim 7, wherein the sensor elements comprise respective pixel electrodes and microlenses, and wherein providing the image sensor comprises, in at least some of the sensor elements, shifting the microlenses transversely relative to the pixel electrodes in a direction toward the optical center by respective shifts that increase responsively to a distance between the sensor elements and the optical center.

10. The method according to claim 9, wherein due to displacement of the center point of the matrix relative to the optical sensor, a first row at a first edge of the matrix is nearer to the optical center than a last row at a second edge of the matrix, opposite the first edge, and wherein the respective shifts of the microlenses of the sensor elements in the last row are greater than the respective shifts of the microlenses of the sensor elements in the first row.

11. The method according to claim 7, and comprising installing the imaging device comprising the image sensor and the objective optics in a hand-held mobile computing device in proximity to an upper end of the mobile computing device,
wherein aligning the image sensor comprises displacing the center point of the matrix by at least ten rows relative to the optical center in an upward direction with respect to the mobile computing device.

* * * * *